Patented Dec. 25, 1934

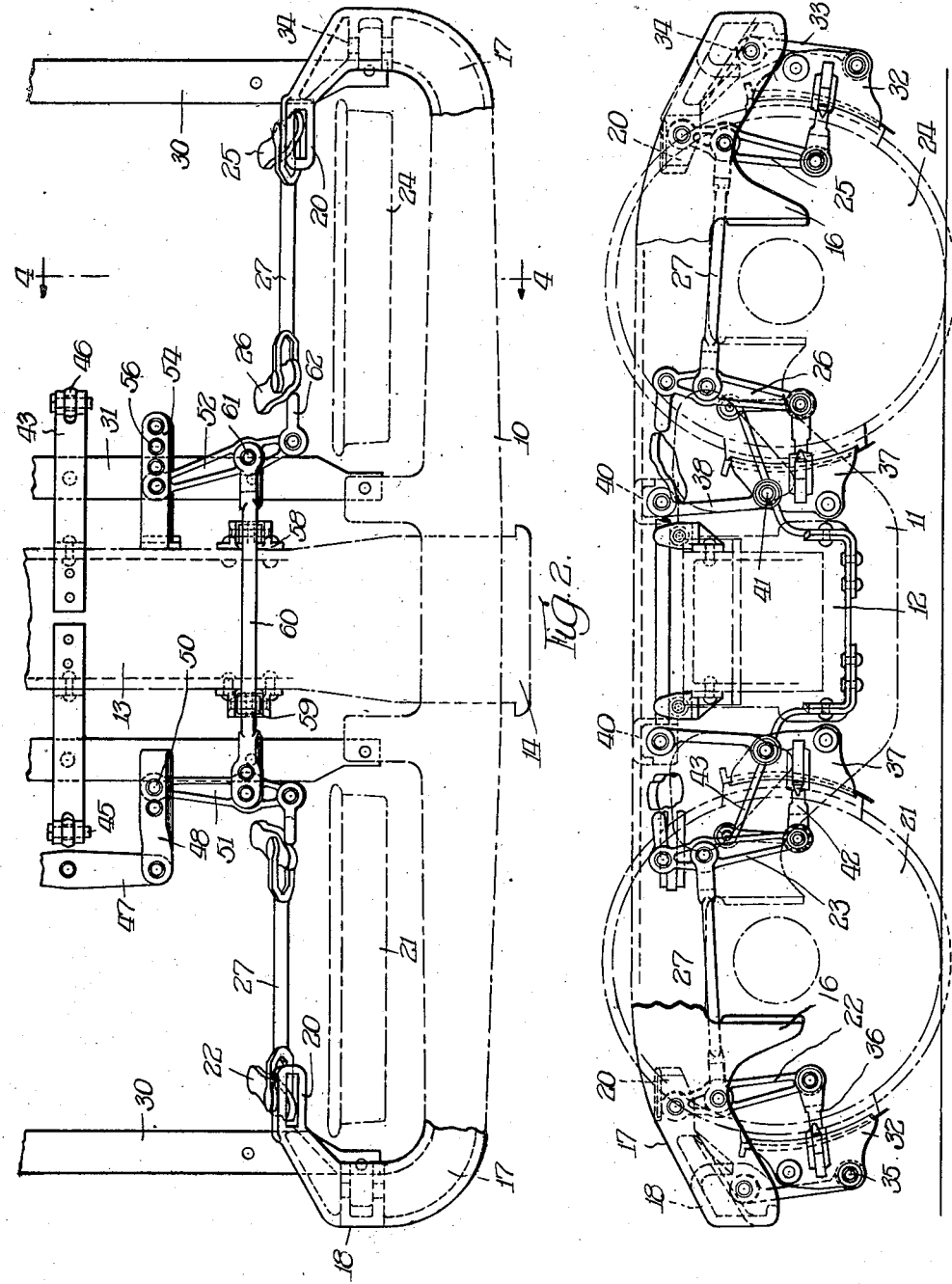

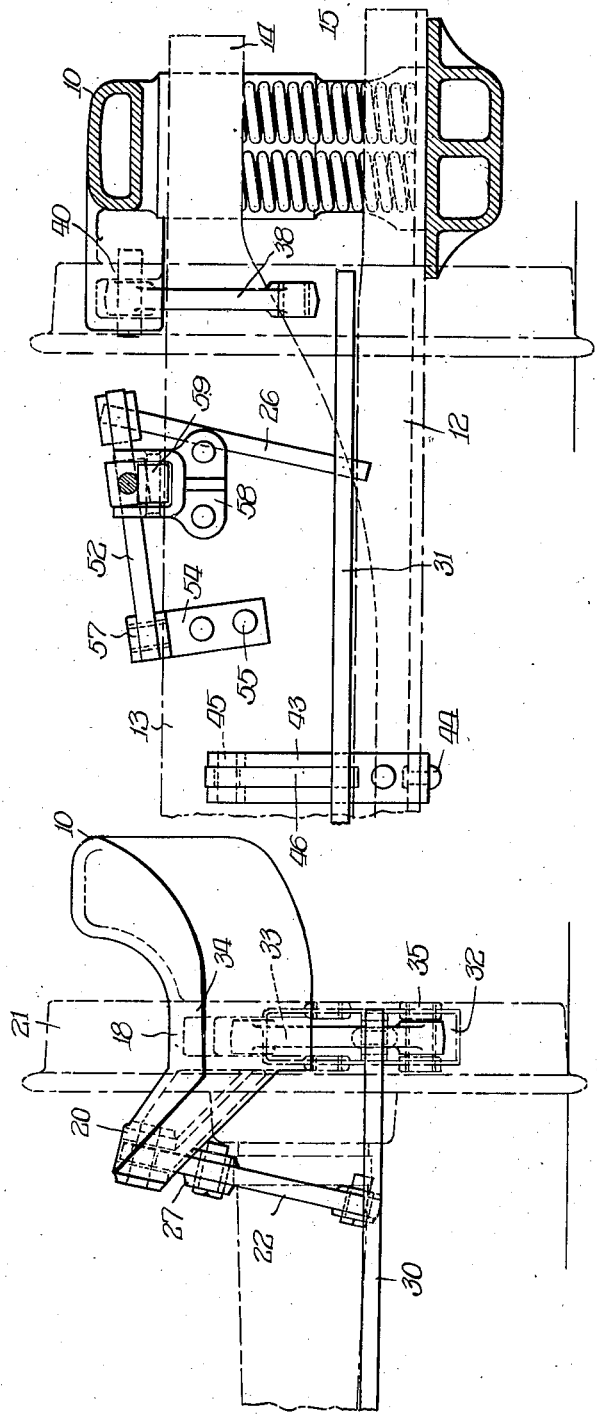

1,985,288

UNITED STATES PATENT OFFICE 1,985,288

CAR TRUCK

William C. Hedgcock, Wilmette, Ill., assignor to American Steel Foundries, Chicago, Ill., a corporation of New Jersey Application August 7, 1931, Serial No. 555,797

42 Claims. (Cl. 188—56)

This invention relates to improvements in car trucks and has reference more particularly to a clasp type of brake rigging for such trucks.

An object of the invention is to provide brake mechanism for a four-wheel truck which will embody a novel arrangement of operating parts necessitated by unusual truck and clearance conditions and wherein the parts will be readily accessible and will meet all service requirements for successful operation.

A further object is to provide a clasp brake type of mechanism adapted for association with a railway car truck, the brake mechanism having a novel and improved arrangement for supporting and operating the outside brake beams, the construction being required by the lowered end portions on the truck frame which do not permit of the usual methods of support and operation.

A further object is to provide brake rigging having angularly arranged truck levers, certain of the levers being pivotally supported by angularly disposed brackets on the frame, the arrangement being especially suited for low truck frames, since a longer leverage results with corresponding development of adequate braking pressure.

With these and various other objects in view, the invention may consist of certain novel features of construction and operation as will be more fully described and particularly pointed out in the specification, drawings and claims appended hereto.

In the drawings which illustrate an embodiment of the device and wherein like reference characters are used to designate like parts—

Figure 1 is a fragmentary top plan view of a railway car truck showing the same equipped with brake rigging of the present invention;

Figure 2 is a side elevation of the car truck and brake rigging shown in Figure 1;

Figure 3 is an end elevation of the same, and

Figure 4 is a transverse sectional elevation taken substantially in the plane as indicated by the line 4—4 of Figure 1.

In the embodiment of the invention selected for illustration, a truck frame is disclosed including a truss type side frame having compression member 10 and tension member 11 to which is suitably secured a spring plank 12, the plank is extending transversely of the truck and serving to unite the respective side members 10. Also extending transversely of the truck is a bolster 13 having a reduced end portion 14 positioned in the central opening provided in the side frame members 10 and by means of springs 15 the bolster is supported on the spring plank. Each side member is provided with depending pedestals 16 for receiving the usual journal boxes, whereby the car axles are journaled in the frame. The side frame members 10 have sloping end portions 17 so that the arcuate end 18 is somewhat lower than the central portion of the frame and for the purpose of providing supporting means for parts of the brake rigging to be described, the arcuate ends 18 terminate in inwardly and upwardly extending fulcrum brackets 20, the brackets being spaced from the main portion of the member 10.

The present invention is concerned with the clasp type of brake rigging adapted for association with four-wheel trucks and accordingly there is shown positioned on the respective sides of the car wheel 21 a dead truck lever 22 and a live truck lever 23. Associated with car wheel 24 in a similar manner is a dead truck lever 25 and a live truck lever 26, the dead truck levers 22 and 25 being supported in angular position from the inwardly directed and angularly disposed brackets 20. Connecting rods 27 located above the car axles serve to join lever 25 with live lever 26 and lever 22 with the live lever 23.

Extending transversely of the frame are brake beams 30 comprising the outside brake beams and brake beams 31 comprising the inside brake beams and being disposed adjacent the bolster 13. Outside brake heads 32 are mounted on the ends of the beams 30, the heads being supported from the frame by means of hangers 33 journaled in the frame by brackets 34 and being pivotally secured to the brake heads at a point below their center as at 35. Bifurcated arms 36 serve to pivotally connect the lower end of the dead truck levers 22 and 25 with their respective brake beams 30.

The inside brake beams 31 have mounted on their outer ends inside brake heads 37, the heads being supported from the frame by hangers 38 pivoted to the frame by brackets 40 and pivotally connected to the brake heads at a point above their center as at 41. Arms 42 pivotally connect the lower ends of the live truck levers 23 and 26, respectively, with their adjacent brake beams.

In order to prevent twisting of the inside brake beams 31, since they are associated with live truck levers, mid-point supports are provided comprising brackets 43 secured by rivets 44 to the spring plank, the brackets having pivotally secured at their outer ends by pins 45 hangers 46, which in turn are rigidly secured to the brake beams.

An equalizing lever 47 is pivotally secured at its ends to links 48, each link being in turn adjustably secured as at 50 to a horizontal lever 51. Positioned opposite lever 51 is a dead horizontal lever 52, pivoted to the bolster 13 by means of a bracket 54 angularly secured to the bolster by rivets 55. The bracket 54 is provided with a plurality of openings 56 so that by means of pin 57 lever 54 can be adjustably positioned as desired.

The bolster 13 is provided, as shown in Figure 4, with roller brackets 58 supporting rollers 59 on which are mounted for substantially frictionless movement a connecting or pull rod 60, the rod serving to join the levers 51 and 52 and being pivoted to the same as at 61. To the outer ends of levers 51 and 52 are pivotally secured links 62 which serve to connect the live truck levers 23 and 26, respectively, to their adjacent horizontal levers.

The brake rigging is actuated by movement of equalizing lever 47 toward the left, Figure 1, causing movement of the inner end of lever 51 likewise toward the left, which, by means of the connecting rod 60, actuates in a similar direction lever 52.

The brake head 37 secured to live lever 23 is correspondingly applied to the wheel since the outer end of lever 51 is actuated toward the right, Figure 1, the movement being transmitted by connecting rod 27 to truck lever 22 and thus to outside brake head 32 to apply the same to the wheel. Movement of the lever 52 is entirely toward the left, which causes corresponding actuation of brake head 37 and brake head 32 in a direction to be applied to the wheel.

From the above description it will be seen that the particular type of frame, required in order to provide the necessary clearance between the truck and hopper car bottom, has associated therewith brake mechanism which is compact and wherein the braking pressures developed by the inside and outside brake heads are equalized. In order to accomplish this it is necessary to angularly position the live and dead truck levers since the outside brake heads are located as high as the lowered ends of the frame will permit. Also the present construction employs brake hangers of the same length for both inside and outside brake heads, the former being secured to the heads at a point above their center, while the latter are secured below the center, the heads being formed with spaced openings for the purpose.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a truck frame, the combination of a side frame member, sloping ends formed on said side member, brackets integral with said sloping end portions and being spaced from the side member and extending inwardly towards each other.

2. In a truck frame, the combination of a side frame member, sloping ends formed on said side member, brackets integral with said sloping end portions and being spaced from the side member and extending inwardly towards each other, said brackets being angularly disposed.

3. In a truck frame, the combination of a side frame member, sloping end portions formed on said member, said end portions being arcuate and terminating in integral brackets extending inwardly toward each other, the brackets being spaced from the side member.

4. In a truck frame, the combination of a side frame member, sloping end portions formed on said member, said end portions being arcuate and terminating in integral brackets extending inwardly toward each other, the bracket being spaced from the side member and being angularly disposed.

5. In a truck side frame, the combination of a compression member, a tension member, spaced columns spacing said compression and tension members, said compression and tension members merging into a single member toward the ends thereof, brake hanger brackets provided in said single member at the ends of the same, and brake lever brackets formed integrally with said member and extending inwardly from the ends thereof.

6. In a car truck, the combination with a truck frame, inside brake beams supported from said frame, outside brake beams supported from said frame, live and dead truck levers connected to said inside and outside beams respectively, means on said frame for pivotally supporting said dead truck levers, said means including angular brackets spaced from the frame and extending inwardly from and being integral with the ends of the same, and hangers pivoted to said frame for supporting the inside and outside beams respectively.

7. In a car truck, the combination with a truck frame, inside and outside brake beams having brake heads mounted on their outer ends, hangers pivoted to said heads and to said frame for supporting the beams, live and dead truck levers connected to the inside and outside beams respectively, and means comprising an integral part of said frame but spaced from the main portion for supporting said dead truck levers, and rods connecting the live and dead truck levers.

8. In brake mechanism, the combination with a truck frame, inside and outside brake beams having brake heads mounted on their outer ends, hangers pivoted to said heads and to said frame for supporting the beams, live and dead truck levers connected to the inside and outside beams respectively, means comprising part of said frame but spaced from the main portion for supporting said dead truck levers, said means including angular brackets connecting with the frame by arcuate end portions, and rods connected to the upper portions of said live and dead truck levers for connecting said levers.

9. In a truck frame, the combination of a side frame member, the ends of said member sloping and having integral arcuate portions defining the overall length of the member, said portions terminating in brackets extending inwardly toward each other and lying in a plane substantially parallel with the side frame members.

10. In a truck frame, the combination of a side frame member, the ends of said member sloping and having integral arcuate portions defining the overall length of the member, said portions terminating in upwardly and inwardly directed brackets, whereby said brackets face each other and lie in a plane above the arcuate portions.

11. In a car truck, the combination of side frame members, a bolster connecting the members, each side frame having sloping ends, angularly disposed brackets supported by each side frame and positioned inwardly of the truck, arcuate portions connecting the brackets and sloping ends respectively, said brackets lying in a plane above the arcuate portions, and a hanger bracket formed in each arcuate portion at the lowest end thereof.

12. In brake mechanism, the combination with a side frame, of brake beams on opposite sides of a pair of wheels, hangers pivoted to the frame for supporting the beams, live and dead truck levers connected to the inside and outside beams respectively, means comprising part of said frame but spaced from the main portion for supporting said dead truck levers, said means including brackets located to the side of the wheel opposite the truck frame, and sloping arcuate portions joining the brackets and the frame.

13. In brake mechanism, the combination with a side frame having arcuate end portions, said portions sloping and providing an integral bracket at the inner terminal end respectively, brake beams located on opposite sides of a pair of wheels, hangers pivoted to the frame for supporting the beams, certain hangers being pivoted to the end portions at their lowest point, and live and dead truck levers connected to the inside and outside beams respectively, with the dead levers being pivoted to the brackets.

14. In brake mechanism, the combination with a side frame having arcuate end portions, said portions sloping and providing an integral bracket at the inner terminal end respectively, brake beams located on opposite sides of a pair of wheels, live and dead truck levers connected to the inside and outside beams respectively, with the dead levers being pivoted to the brackets, whereby the levers are positioned to the inside of the wheels.

15. In a car truck, having side frames, a spring supported bolster connecting the frames, each frame having arcuate sloping end portions providing an integral terminal bracket, brake beams on opposite sides of a pair of wheels, live and dead truck levers connected to the inside and outside beams respectively, with the dead levers being pivoted to the brackets, one live lever connected to an equalizing lever, means pivoted to the bolster and connecting the other live lever, and rods connecting the levers.

16. In a brake mechanism, the combination of brake beams on opposite sides of a pair of wheels, identical brake heads with two pin openings, the heads outside of said wheels being supported at the lower pin hole by hangers outside the brake beam.

17. In a brake mechanism, the combination of brake beams on opposite sides of a pair of wheels, identical brake heads with two pin openings, the heads outside of said wheels being supported below their center lines by hangers outside the brake beam.

18. In a brake mechanism, the combination of brake beams on opposite sides of a pair of wheels, identical brake heads with two pin openings, the heads outside of said wheels being supported at the lower pin hole by hangers outside the brake beam, and the heads inside said wheels being supported at the upper pin hole.

19. In a brake mechanism, the combination of brake beams on opposite sides of a pair of wheels, identical brake heads with two pin openings, the heads outside of said wheels being supported below their center lines by hangers outside the brake beam, and the heads inside said wheels being supported above their center lines.

20. In a brake mechanism, the combination of brake beams on opposite sides of a pair of wheels, hangers supporting the brake beams from arcuate end portions of the side frame, and brake levers balancing said brake beams, said brake levers being each supported from an integral bracket inwardly extending from said arcuate end portions respectively.

21. In a car truck, the combination with a side frame of brake beams on opposite sides of a pair of wheels, sloping ends on said side frame having integral arcuate portions defining the overall length of the frame, brake heads secured to the ends of said inside and outside beams respectively, and hangers secured to said arcuate portions for supporting the outside heads, said hangers being positioned outwardly of the outside beams.

22. In a car truck, the combination with a side frame of brake beams on opposite sides of a pair of wheels, sloping ends on said side frame having integral arcuate portions defining the overall length of the frame, identical brake heads with two pin openings secured to the ends of said inside and outside beams respectively, the outside heads being supported at the lower pin opening by hangers depending from said arcuate portions and passing outside the brake beam.

23. In a car truck, the combination with a side frame of brake beams on opposite sides of a pair of wheels, sloping ends on said side frame having integral arcuate portions defining the overall length of the frame, brake heads secured to the ends of said inside and outside beams respectively, and hangers secured to said arcuate portions for supporting the outside heads, said hangers connecting with the heads below their center and passing outside the brake beam.

24. In a car truck, the combination with a side frame of brake beams on opposite sides of a pair of wheels, sloping ends on said side frame having integral arcuate portions defining the overall length of the frame, identical brake heads with two pin openings secured to the ends of said inside and outside beams respectively, the outside heads being supported at the lower pin opening by hangers depending from said arcuate portions and passing outside the brake beam, and the inside heads being supported at the upper pin opening by hangers depending from the central portion of the frame.

25. In a car truck, the combination with a side frame of brake beams on opposite sides of a pair of wheels, sloping ends on said side frame having integral arcuate portions defining the overall length of the frame, brake heads secured to the ends of said inside and outside beams, the outside heads being supported below their center line by hangers depending from said arcuate portions and passing outside the brake beam, and the inside heads being supported above their center line by hangers depending from the central portion of the frame.

26. In a car truck, the combination with a side frame of brake beams on opposite sides of a pair of wheels, live and dead truck levers connected to the inside and outside beams respectively, means comprising part of said frame but spaced from the main portion for supporting said dead truck levers, said means including brackets having sloping arcuate portions connecting with the frame, brake heads on said beams, and hangers depending from the arcuate portions for supporting the outside heads, said hangers being positioned outwardly of the outside beams.

27. In a car truck, the combination with a side frame of brake beams on opposite sides of a pair of wheels, live and dead truck levers connected to the inside and outside beams respectively, means comprising part of said frame but spaced from the main portion for supporting said dead truck levers, said means including brackets having sloping arcuate portions connecting with the frame, identical brake heads having two pin openings secured to the ends of said outside and inside beams, the outside heads being supported at the lower pin opening by hangers depending from said arcuate portions and passing outside the brake beam.

28. In a car truck, the combination with a side frame of brake beams on opposite sides of a pair of wheels, live and dead truck levers connected to the inside and outside beams respectively, means comprising part of said frame but spaced from the main portion for supporting said dead truck levers, said means including brackets having sloping arcuate portions connecting with the frame, identical brake heads with two pin openings secured to the ends of said inside and outside beams, the outside heads being supported at the lower pin opening by hangers depending from said arcuate portions and passing outside the brake beam, and the inside heads being supported at the upper pin opening by hangers depending from the central portion of the frame.

29. In a car truck, the combination with a side frame of brake beams on opposite sides of a pair of wheels, live and dead truck levers connected to the inside and outside beams respectively, means comprising part of said frame but spaced from the main portion for supporting said dead truck levers, said means including brackets having sloping arcuate portions connecting with the frame, brake heads secured to the outside and inside beams, the outside heads being supported below their center line by hangers depending from said arcuate portions and passing outside the brake beam.

30. In a car truck, the combination with a side frame of brake beams on opposite sides of a pair of wheels, live and dead truck levers connected to the inside and outside beams respectively, means comprising part of said frame but spaced from the main portion for supporting said dead truck levers, said means including brackets having sloping arcuate portions connecting with the frame, brake heads secured to the ends of said inside and outside beams, the outside heads being supported below their center line by hangers depending from said arcuate portions and passing outside the brake beam, and the inside heads being supported above their center line by hangers depending from the central portion of the frame.

31. In a car truck, the combination with a side frame having arcuate end portions, said portions sloping and providing an integral bracket at the inner terminal end respectively, brake beams located on opposite sides of a pair of wheels, live and dead truck levers connected to the inside and outside beams respectively, said dead truck levers being pivoted to the integral brackets, and hangers pivoted to the end portions at their lowest point and connecting with the brake heads on the outside beams below their center.

32. In a car truck, the combination with a side frame having arcuate end portions, said portions sloping and providing an integral bracket at the inner terminal end respectively, brake beams located on opposite sides of a pair of wheels, live and dead truck levers connected to the inside and outside beams respectively, said dead truck levers being pivoted to the integral brackets, identical brake heads having two pin openings carried at the ends of said beams, the outside heads being supported at the lower pin opening by hangers depending from the end portions and passing outside the brake beam.

33. In a car truck, the combination of a truck frame including a side frame, a load carrying member resiliently supported on the side frame, spaced wheel and axle assemblies disposed on each side of said load carrying member for supporting said truck frame, dead and live truck levers disposed on each side of each wheel, the dead truck levers being mounted adjacent the ends of the truck frame, a connection between dead and live truck levers of each wheel, said connection being disposed above the axle of said wheel and axle assemblies, a dead horizontal lever the inner end of which is pivotally supported on said load carrying member, the outer end thereof being connected to one of said live truck levers, a live horizontal lever the outer end of which is connected to the other of said live truck levers, an equalizer lever connected to the inner end of said live horizontal lever, and a connection between said dead and live horizontal levers.

34. In a car truck, the combination of a truck frame including a side frame, a load carrying member resiliently supported on the side frame, spaced wheel and axle assemblies disposed on each side of said load carrying member for supporting said truck frame, dead and live truck levers disposed on each side of each wheel, the dead truck levers being mounted adjacent the ends of the truck frame, a connection between dead and live truck levers of each wheel, said connection being disposed above the axle of said wheel and axle assemblies, a dead horizontal lever the inner end of which is pivotally supported on said load carrying member the outer end thereof being connected to one of said live truck levers, a live horizontal lever the outer end of which is connected to the other of said live truck levers, an equalizer lever connected to the inner end of said live horizontal lever, and a connection between said live and dead horizontal levers supported on said load carrying member.

35. In a car truck, the combination of a truck frame including a side frame, a load carrying member resiliently supported on the side frame, spaced wheel and axle assemblies disposed on each side of said load carrying member for supporting said truck frame, dead and live truck levers disposed on each side of each wheel, the dead truck levers being mounted adjacent the ends of the truck frame, a connection between dead and live truck levers of each wheel, said connection being disposed above the axle of said wheel and axle assemblies, a dead lever the inner end of which is pivotally supported on said load carrying member, the outer end thereof being connected to one of said live truck levers, a live lever the outer end of which is connected to the other of said live truck levers, an equalizer lever connected to the end of said live lever, and a connection between said dead and live levers.

36. In a car truck, the combination of a truck frame including a side frame, a load carrying member resiliently supported on the side frame, spaced wheel and axle assemblies disposed on each side of said load carrying member for supporting said truck frame, dead and live truck levers disposed on each side of each wheel, the dead truck levers being mounted adjacent the ends of the truck frame, a connection between dead and live truck levers of each wheel, said connection being disposed above the axle of said wheel and axle assemblies, a dead lever the inner end of which is pivotally supported on said load carrying member, the outer end thereof being connected to one of said live truck levers, a live lever the outer end of which is connected to the other of said live truck levers, an equalizer lever connected to the end of said live lever, and a connection between said live and dead horizontal levers supported on said load carrying member.

37. In a car truck, the combination of a truck frame including a side frame, a load carrying member resiliently supported on the side frame, spaced wheel and axle assemblies disposed on each side of said load carrying member for supporting said truck frame, dead and live truck levers disposed on each side of each wheel, the dead truck levers being mounted adjacent the ends of the truck frame, a connection between dead and live truck levers of each wheel, said connection being disposed above the axle of said wheel and axle assemblies, a dead horizontal lever one end of which is pivotally supported on said load carrying member, the other end thereof being connected to one of said live truck levers, a live horizontal lever one end of which is connected to the other of said live truck levers, an equalizer lever connected to the other end of said live horizontal lever, and a connection between said dead and live horizontal levers.

38. In a car truck, the combination of a truck frame including a side frame, a load carrying member resiliently supported on the side frame, spaced wheel and axle assemblies disposed on each side of said load carrying member for supporting said truck frame, dead and live truck levers disposed on each side of each wheel, the dead truck levers being mounted adjacent the ends of the truck frame, a connection between dead and live truck levers of each wheel, said connection being disposed above the axle of said wheel and axle assemblies, a dead horizontal lever one end of which is pivotally supported on said load carrying member, the other end thereof being connected to one of said live truck levers, a live horizontal lever one end of which is connected to the other of said live truck levers, an equalizer lever connected to the other end of said live horizontal lever, and a connection between said live and dead horizontal levers supported on said load carrying member.

39. In a car truck, the combination of a truck frame including a side frame, a load carrying member resiliently supported on the side frame, spaced wheel and axle assemblies disposed on each side of said load carrying member for supporting said truck frame, dead and live truck levers disposed on each side of each wheel, the dead truck levers being mounted adjacent the ends of the truck frame, a connection between dead and live truck levers of each wheel, said connection being disposed above the axle of said wheel and axle assemblies, a dead lever one end of which is pivotally supported on said load carrying member, the other end thereof being connected to one of said live truck levers, a live lever one end of which is connected to the other of said live truck levers, an equalizer lever connected to the end of said live lever, and a connection between said dead and live levers.

40. In a car truck, the combination of a truck frame including a side frame, a load carrying member resiliently supported on the side frame, spaced wheel and axle assemblies disposed on each side of said load carrying member for supporting said truck frame, dead and live truck levers disposed on each side of each wheel, the dead truck levers being mounted adjacent the ends of the truck frame, a connection between dead and live truck levers of each wheel, said connection being disposed above the axle of said wheel and axle assemblies, a dead lever one end of which is pivotally supported on said load carrying member, the other end thereof being connected to one of said live truck levers, a live lever one end of which is connected to the other of said live truck levers, an equalizer lever connected to the end of said live lever, and a connection between said live and dead horizontal levers supported on said load carrying member.

41. In a side frame, the combination of tension and compression members and spaced integrally connecting columns forming a window therewith, said tension and compression members merging adjacent the ends thereof and being provided with journal boxes, said compression member being provided with a substantially straight horizontal upper chord, said side frame being provided with a downwardly and inwardly extending bracket portion disposed outwardly of said journal boxes and providing a support for an associated brake hanger, and a fulcrum bracket disposed adjacent said bracket portion and extending upwardly and inwardly therefrom.

42. In a side frame, the combination of tension and compression members and spaced integrally connecting columns forming a window therewith, said tension and compression members merging adjacent the ends thereof and being provided with journal boxes, said compression member being provided with a substantially straight horizontal upper chord, said side frame being provided with a downwardly and inwardly extending bracket portion disposed outwardly of said journal boxes and providing a support for an associated brake hanger, and a fulcrum bracket disposed adjacent said bracket portion and extending upwardly and inwardly therefrom, said fulcrum bracket extending in a reverse direction from said first named bracket portion.

WILLIAM C. HEDGCOCK.